United States Patent [19]

Root

[11] 4,378,507
[45] Mar. 29, 1983

[54] EMERGENCY POWER SHUTDOWN SYSTEM FOR EDUCATIONAL LABORATORY

[76] Inventor: Robert H. Root, Box 506, Vermilion, Ohio 44089

[21] Appl. No.: 218,348

[22] Filed: Dec. 22, 1980

[51] Int. Cl.³ .............................................. G08C 17/00
[52] U.S. Cl. ................................... 307/326; 361/182; 307/115
[58] Field of Search ................... 307/38, 40, 115, 116, 307/29, 326; 340/825.72, 825.06, 825.23, 825.73; 361/182, 183, 194, 167, 168

[56] References Cited

U.S. PATENT DOCUMENTS 3,454,927  7/1969  Dame et al. ............... 340/825.72 X

*Primary Examiner*—G. Z. Rubinson
*Assistant Examiner*—James L. Dwyer
*Attorney, Agent, or Firm*—Pearne, Gordon, Sessions, McCoy & Granger

[57] ABSTRACT

The emergency power shutdown system is especially adapted for use in an educational laboratory containing a plurality of items of potentially dangerous educational equipment. The system includes a portable transmitter unit adapted to be carried by the instructor in the laboratory and a control unit having a receiver fixedly mounted in the laboratory and capable of receiving the RF signal from the transmitter unit to actuate a relay-operated power shutdown unit to stop the flow of power through the system upon receipt of the RF signal from the instructor. The system provides for faster shutdown of the power supply system in an emergency situation, reducing the chance of injuries during operation of the potentially dangerous equipment.

6 Claims, 4 Drawing Figures

EMERGENCY POWER SHUTDOWN SYSTEM FOR EDUCATIONAL LABORATORY

BACKGROUND OF THE INVENTION

1. Field of the Invention

This invention relates to power safety devices, and in particular to a safety device permitting shutdown of the power to an educational laboratory or other environment in which potentially dangerous equipment is present.

2. Description of the Prior Art

In an educational laboratory, such as those containing woodworking and metalworking equipment, it is common to have machines, such as drills, lathes, and other apparatus, for performing cutting and forming operations. When these machines are operated by skilled operators, the chances of danger are relatively small. However, in an educational environment, these machines are often operated by inexperienced students or those unfamiliar with the workings of the machines, and the possibility of injury resulting from operation of the machines is greatly increased.

When confronted with an adverse situation, students usually will react in a predicable manner. Hopefully, with proper instruction, the student defines the problem and reacts with the appropriate solution. In some cases, the student will panic and react with an inappropriate response, making the situation more dangerous, or will just "freeze" and do nothing at all.

An instructor is usually present in the laboratory to supervise the operation of these machines, but it is impossible for the instructor to be present at the position of each machine in the laboratory, particularly if the laboratory is relatively large. When such an emergency situation occurs, it is important that the instructor intervene to prevent any injury or any further injury to the students in the laboratory. It is most important for the instructor to immediately stop the operation of the machine as an initial step in this intervention. For this reason, most educational laboratories in secondary and post-secondary schools are equipped with some form of master power shutdown system. Normally, this system takes the form of "panic buttons" mounted around the outside walls of the laboratory. These panic buttons are spaced around the laboratory to enable the instructor or some other individual to shut off the power within the laboratory in the event of an emergency, and thus shut down the potentially dangerous machinery in the laboratory.

The panic button operates a power shutdown system connected to the master power supply system for the laboratory. Two types of shutdown units are commonly used. In larger shops with higher power requirements, a relay system is employed which is designed around primary contactors held closed by a magnet. When the circuit is interrupted by actuation of the panic button, the electric magnet deactivates, and a spring pulls the contactors out, interrupting the main power source. Smaller laboratories and shops employ a system which is designed around contactors activated by a holding circuit. When the button is depressed, a circuit is completed, energizing the magnet.

The placement of the panic buttons around the walls of the laboratory is critical, particularly in a larger laboratory in which the instructor must have access to a panic button within seconds. It is necessary, therefore, for the instructor to know the location of the panic buttons in all of the laboratories and be able to react within an extremely short period of time in the case of an emergency. In larger laboratories in which a large number of panic buttons are present, it is possible for the instructor to become momentarily confused or require additional time to locate the panic button in an emergency situation. Reaction to an emergency situation appears to be one of the major drawbacks of the panic button system. The time required for someone to react to an adverse situation, locate a panic button, and then push this button is in many instances too long.

SUMMARY OF THE INVENTION

The present invention provides an emergency power shutdown system for an educational laboratory which overcomes the problems of the prior art shutdown systems and provides capabilities and advantages which have not been previously possible. The present invention allows the instructor to carry a device with him throughout the laboratory which will immediately trigger the shutdown of the power system. When an emergency occurs, the instructor can immediately actuate the shutdown system and stop power to the potentially dangerous machinery in the laboratory. With the present invention, it is no longer necessary for the instructor to locate a "panic button," thus saving valuable time in a crisis situation. An instructor carrying the actuation device which comprises a portion of the present invention has the ability to intervene when he deems necessary from any location in the laboratory. The total reaction time from defining a dangerous situation to power interruption is drastically reduced, and thus the possibilities of serious injuries occurring to the students or other persons in the laboratory are also reduced.

The emergency power shutdown system of the present invention is adaptable to be used with both power shutdown units presently in common use in most educational laboratories. Thus, the present invention has universal application to the majority of educational laboratories which have a power interruption system in place, and it is not necessary to provide any major modifications to the existing systems in order to install the present invention.

These and other advantages are provided by the present invention of an emergency power shutdown system for an educational laboratory. The system comprises a power supply system and a plurality of items of potentially dangerous educational equipment. Each item is connected to be operational only with power from the power supply system. A portable transmitter unit is adapted to be carried by an instructor in the laboratory. The transmitter unit is capable of sending an RF signal. A control unit has a receiver fixedly mounted in the laboratory and capable of receiving the RF signal from the transmitter. A relay-operated power shutdown unit is inserted in the power supply system and is activated by the receiver to stop the flow of power through the system upon receipt of the RF signal from the receiver.

Preferably, the control unit includes a first relay connected to the receiver, and the shutdown unit includes a coil associated with the receiver. The coil operates a second relay which is connected into the power supply system. The second relay is normally open when power is being supplied by the power supply system and the coil operates to close the relay. Alternatively, the second relay may be normally closed when power is being supplied from the power supply system and the coil operates to open the relay, whereby the present invention may be installed with either type of commonly used power shutdown system.

DETAILED DESCRIPTION OF THE PREFERRED EMBODIMENT

Figure 1:
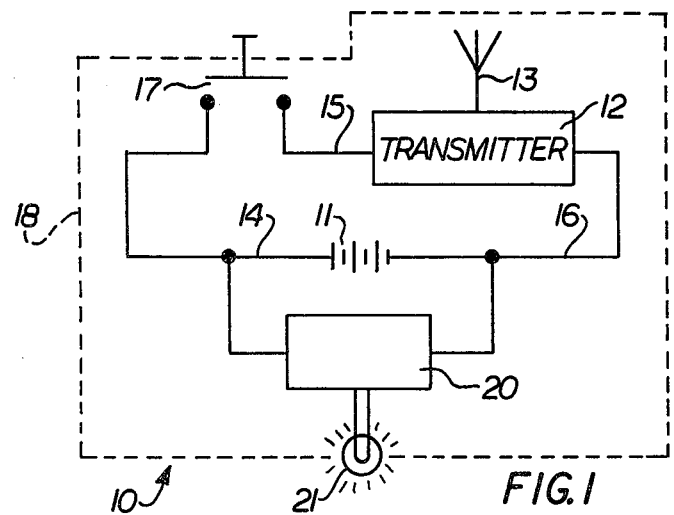
FIG. 1 is an electrical schematic of the transmitter unit comprising a portion of the emergency power shutdown system of the present invention.

Referring more particularly to the drawings, FIG. 1 shows a portable transmitter unit 10 which is adapted to be carried by the instructor throughout the laboratory. The unit 10 comprises a battery 11 connected to a small portable radio transmitter 12 having an antenna 13. The battery 11 is connected to the transmitter 12 by lines 14, 15, and 16. Between the lines 14 and 15 is a push button switch 17. The transmitter 12 is normally off and is activated by pressing the button 17 to close the circuit between the battery 11 and the transmitter 12. Upon actuation of the switch 17, power is supplied to the transmitter 12 and the transmitter sends an RF signal on a predetermined frequency. Although the transmitter 12 is relatively small, it should be capable of sending an RF signal over a range of 50 yards. This range will be sufficient to supply the necessary RF signal for the majority of educational laboratories. The portable transmitting unit 10 is enclosed within a plastic case 18.

The transmitter unit 10 of FIG. 1 may also include a voltage sensor 20 connected to lines 14 and 16 on each side of the battery 11. The voltage sensor 20 measures the voltage output of the battery 11, and when the voltage output drops below a designated level, the sensor closes the circuit to operate a lamp 21 mounted on the exterior of the case 18. The lamp 21 may be used as a signal to the instructor to indicate that the power supply in the portable transmitter unit 10 is below a predetermined level and that the battery 11 needs to be replaced or recharged.

Figure 2:
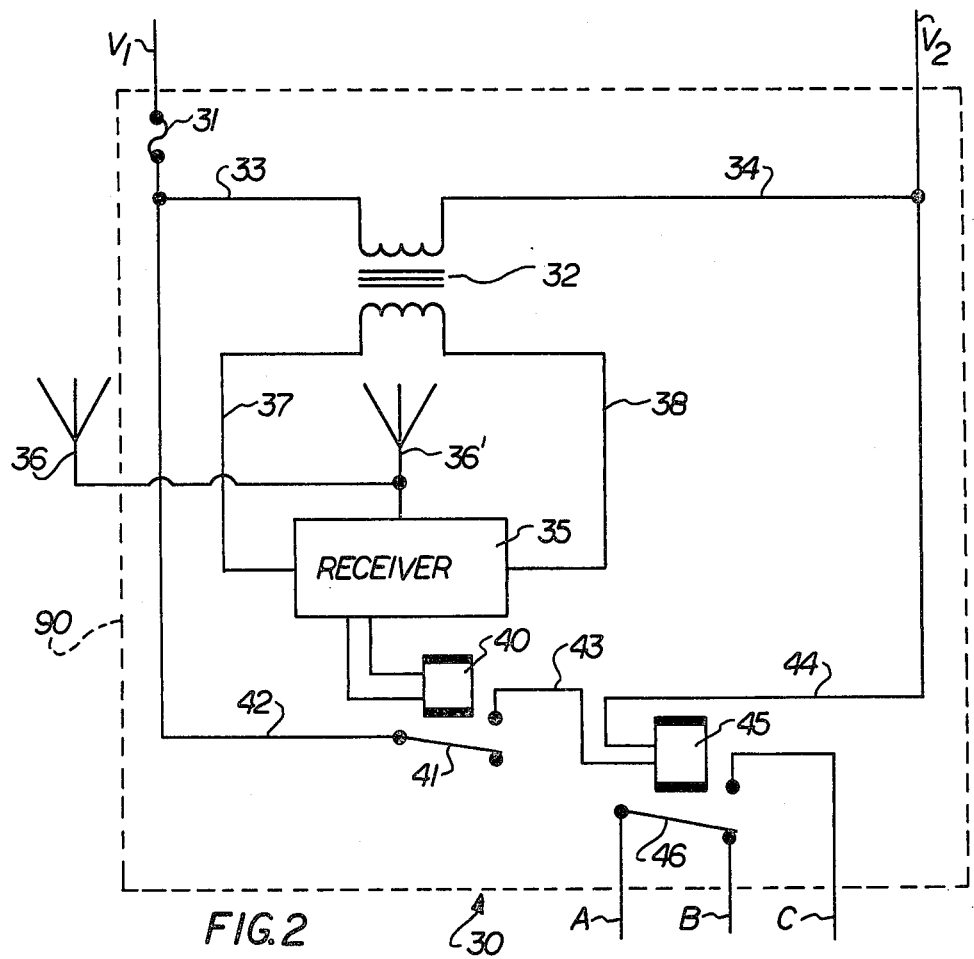
FIG. 2 is an electrical schematic of the power control unit comprising a portion of the emergency shutdown system of the present invention.

FIG. 2 shows a power control unit 30 comprising a portion of the power shutdown system of the present invention which is adaptable to be connected to either type of conventional relay-operated power shutdown unit. The control unit 30 of FIG. 2 operates from a conventional power source comprising inputs $V_1$ and $V_2$. The inputs $V_1$ and $V_2$ typically supply 110-volt, single-phase alternating current. A fuse 31 is installed adjacent to the input $V_1$. A transformer 32 has one side connected to the inputs $V_1$ and $V_2$ by lines 33 and 34, and has the other side connected to a radio receiver 35 having an antenna 36 or 36' by lines 37 and 38. The receiver 35 is connected to the transformer 32. The transformer 32 converts the 110 VAC from the inputs $V_1$ and $V_2$ to 24 VAC which is used to operate the radio receiver 35.

The radio receiver 35 is of the type adapted to receive a distinct RF signal on a preassigned frequency. Preferably, the signal sent by the transmitter 12 and received by the receiver 35 is digitally encoded. Such digitally encoded RF signals can be generated by conventional transmitting means, and can be selectively sensed by conventional receiving means. By digitially encoding the RF signal, it is less likely that extraneous signals may enter the laboratory and inadvertently shut down the equipment in the laboratory. In addition, digital encoding allows the use of different transmitting and receiving units operating on the same frequency within the same educational institution operating different control systems in different laboratories.

Upon receipt of the appropriate RF signal, the receiver 35 supplies power to a coil 40 which operates a relay 41. One side of the relay 41 is connected to the power supply input $V_1$ by a line 42. The closed contact on the other side by the relay 20 is connected to the power supply input $V_2$ by lines 43 and 44. A coil 45 is inserted between the lines 43 and 44. The coil 45 operates a relay 46.

The control unit 30 shown in FIG. 2 provides three outputs A, B, and C. The output A is connected to one side of the relay 46, and the outputs B and C are connected to the two contacts on the other side of the relay 46. The outputs A, B, and C together provide the lines for operating both types of conventional relay-operated power shutdown units, which are depicted in FIGS. 3 and 4.

Figure 3:
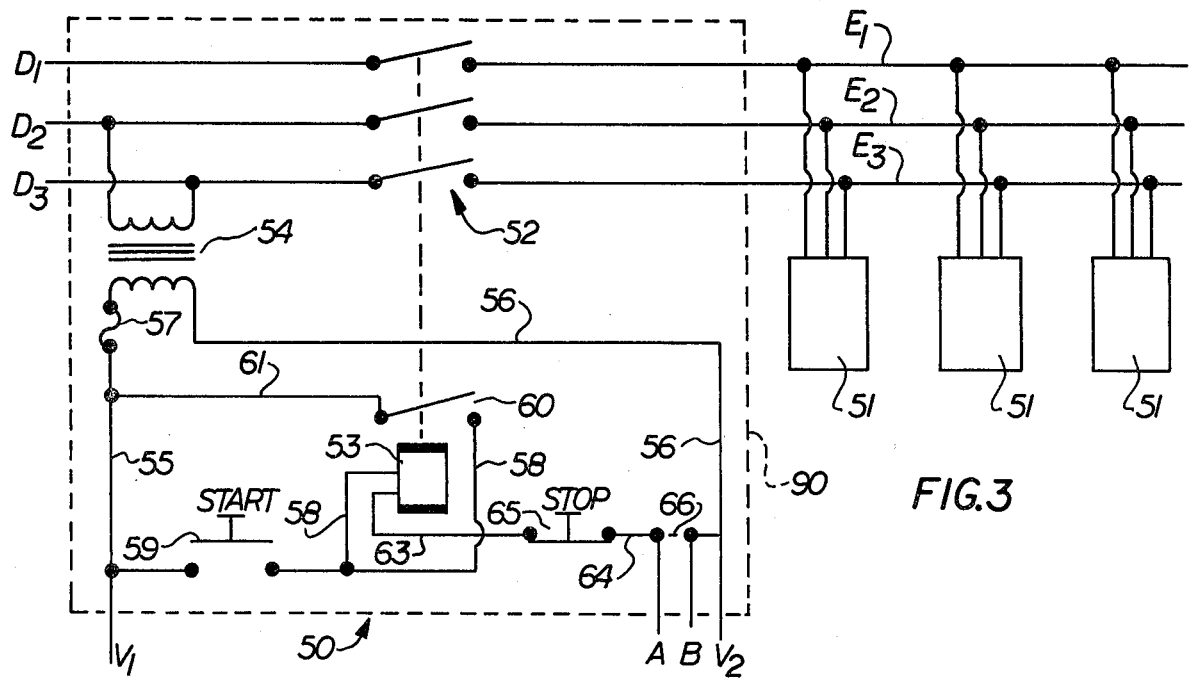
FIG. 3 is an electrical schematic of one type of relay-operated power shutdown unit comprising a portion of the present invention.
Figure 4:
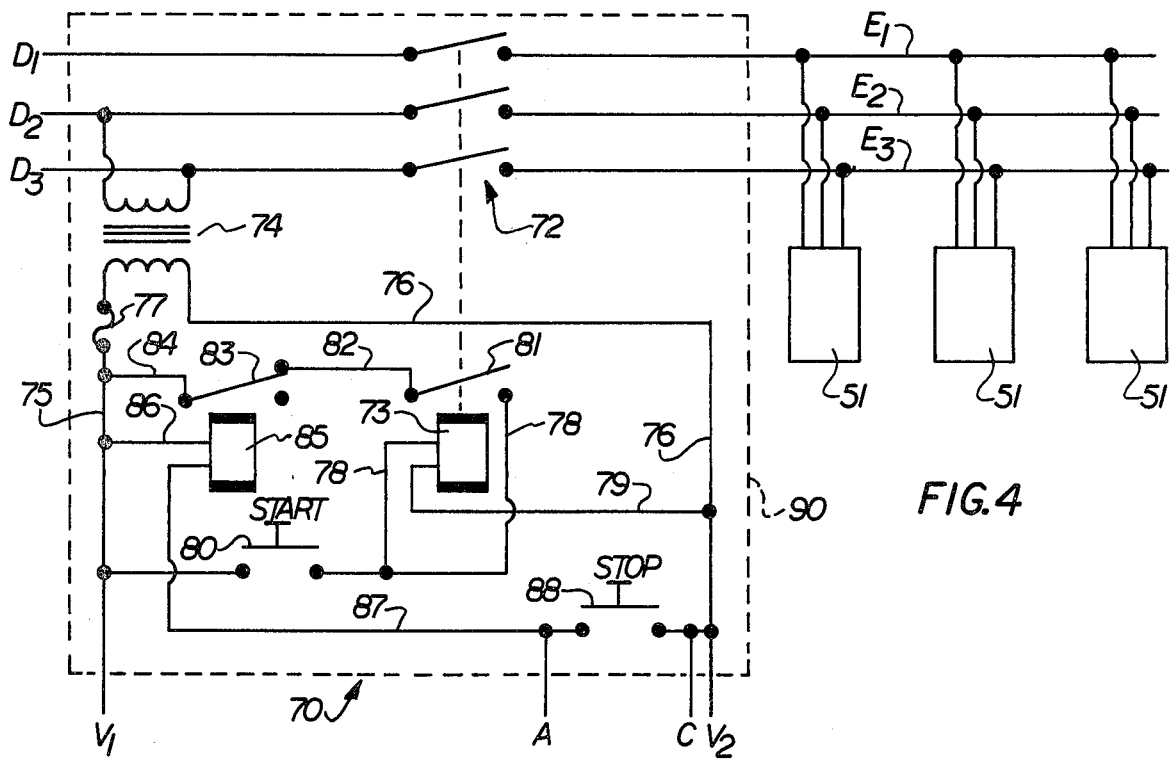
FIG. 4 is an electrical schematic of another type of relay-operated power shutdown unit corresponding to that of FIG. 3.

FIG. 3 shows one type of power shutdown unit comprising a portion of the system of the present invention. The shutdown unit 50 shown in FIG. 3 is typically used in larger shops with higher power requirements. The power is furnished by a power supply system through inputs $D_1$, $D_2$ and $D_3$. The inputs $D_1$, $D_2$ and $D_3$ provide a three-phase alternating current power supply which may be, for example, 208, 220, or 440 volts. The control power supply is fed from the unit through outputs $E_1$, $E_2$ and $E_3$. A plurality of items of equipment 51 are connected to the power supply outputs $E_1$, $E_2$ and $E_3$. In an educational laboratory, the equipment 51 may comprise metalworking or woodworking machinery which may be potentially dangerous when operated by an inexperienced student.

The unit 50 in FIG. 3 is designed around a multiple contact relay 52 inserted between the power supply inputs $D_1$, $D_2$ and $D_3$ and the outputs $E_1$, $E_2$ and $E_3$. The relay 52 is operated by a coil 53. Power is supplied to the coil 53 from two phases of the power supply inputs. A transformer 54 is connected to two of the phases of the power supply. Lines 55 and 56 are connected to the transformer 54 and supply 110 VAC from the transformer. The power supply lines 55 and 56 may also be used to provide the power supply inputs $V_1$ and $V_2$ for the power control unit 30 of FIG. 2. A fuse 57 may be inserted in the line 55 adjacent to the output of the transformer 54.

One end of the coil 53 is connected to the power supply line 55 by a line 58. The coil 53 is initially energized by connecting the line 58 to the power supply line 55 by means of a "start" push button switch 59. The "start" switch 59 is normally open, creating an open circuit between the line 58 and the power supply line 55. When the "start" switch 59 is actuated, the circuit is closed, and the coil 53 is connected to the power supply line 55. When the coil 53 is energized, it also closes a relay 60 having one side connected to the power supply 55 by a line 61 and having the closed contact on the other side connected to the line 58. After the coil 53 has been initially energized by actuation of the "start"

switch 59, the relay 60 is closed, so that the coil 53 continues to be energized through the lines 58, the relay 60 and the line 61 to the power supply line 55. The relay 60 thus provides a latch which maintains the coil 53 energized after actuation of the "start" switch 59.

The other end of the coil 53 is connected to the other power supply line 56 by lines 63 and 64. Between the lines 63 and 64 is a panic button switch 65. The panic button switch 65 is normally closed, completing the circuit between the line 63 and the line 64. When the panic button switch 65 is actuated, the circuit is opened, and the coil 53 is disconnected from the power supply line 56. In the prior art control systems, the lines 64 and 56 were directly connected together by a line 66.

The prior art control system similar to FIG. 3 operated by actuating the "start" push button switch 59 to energize the coil 53. (The line 66 was present in these prior art systems connecting the line 64 to the line 56.) With the coil 53 energized, the relays 52 and 60 closed. The closing of the relay 60 provided a circuit from the line 55 through the lines 61 and 58 to continue energizing the coil 53 to maintain the relay 52 closed. With the relay 52 closed, power was supplied from the input $D_1$, $D_2$ and $D_3$ through the relay 52 to the outputs $E_1$, $E_2$ and $E_3$. Upon sensing an emergency situation, the instructor in the laboratory pushed the panic button switch 65 to open the circuit between the lines 63 and 56, de-energizing the coil 53 and opening the relays 52 and 60. When the panic button switch 65 was deactuated, the switch 65 was closed, but the relay 60 remained open and the coil 53 remained de-energized. To return the power supply to operate the equipment 51, the instructor actuated the "start" push button switch 59 to close the circuit between the lines 55 and 58, energizing the coil 53 and closing the relays 52 and 60.

In accordance with the present invention, the two outputs A and B of the control unit 30 of FIG. 2 are connected in the shutdown unit 50 of FIG. 3 between the lines 56 and 64, and these lines are isolated by removal of the line 66. As shown in FIG. 1, with the relay 46 normally open, the outputs A and B provide a closed circuit, so that the line 64 is connected to the power supply line 56. Upon receiving a predetermined RF signal, the receiver 35 closes the circuit to energize the coil 40, closing the relay 41 and energizing the coil 45. The coil 45 closes the relay 46, opening the circuit between the outputs A and B. In FIG. 3, the open circuit between the outputs A and B de-energizes the coil 53 and opens the relay 52 to interrupt the power supply to the outputs $E_1$, $E_2$ and $E_3$, shutting down the equipment 51.

A different type of relay-operated power shutdown unit 70 is indicated in FIG. 4. This unit is often used in smaller laboratories and shops. The power is supplied to the shutdown unit 70 through the three-phase power supply inputs $D_1$, $D_2$ and $D_3$, and the power is supplied from the unit 70 to the equipment 51 through the three-phase outputs $E_1$, $E_2$ and $E_3$. The flow of the power from the inputs $D_1$, $D_2$ and $D_3$ to the outputs $E_1$, $E_2$ and $E_3$ is controlled by a relay 72, which is operated by a coil 73. Power is supplied to the coil 73 from two phases of the power supply inputs using a transformer 74. Lines 75 and 76 are connected to the transformer 74. The power supply lines 75 and 76 may also be used to supply the power supply inputs $V_1$ and $V_2$ to the power control unit 30 of FIG. 2. A fuse 77 may be inserted in the line 75 adjacent to the transformer 74.

One end of the coil 73 is connected by a line 78 to the power supply line 75, and the other side is connected by a line 79 to the other power supply line 76. A "start" push button switch 80 is connected between the line 75 and 78. The "start" switch 80 is normally open, creating an open circuit between the line 78 and the power supply line 75. When the "start" switch 80 is actuated, the circuit is closed, and the coil 73 is connected to the power supply line 75. When the coil 73 is energized, it also closes a relay 81. The closed contact of the relay 81 is connected to the line 78. The other side of the relay 81 is connected to the power supply line 75 by a line 82. The line 82 is connected to the open contact of a relay 83 having the other side connected to the power supply line 75 by a line 84. The relay 83 is operated by a coil 85 having one end connected to the power supply line 75 by a line 86 and having the other end connected to the other power supply line 76 by a line 87. A panic button switch 88 has one side connected to the power supply line 76 and has the other side connected to the line 87. The panic button switch 88 is normally open, creating an open circuit between the power supply line 76 and the line 87. When the panic button switch 88 is actuated, the coil 85 is connected to the power supply line 76. When the coil 85 is energized, the relay 83 is closed, disconnecting the line 82 from the power supply line 75.

In the conventional operation of the power shutdown unit 70 of FIG. 4, power is supplied from the power supply line 75, through the line 84, through the open relay 83, through the line 82, through the closed relay 81, and through the line 78 to the coil 73. Upon sensing an emergency situation, the instructor pushes the panic button switch 88 to provide closed circuit through the switch 88 and the line 87 to energize the coil 85. When the coil 85 is energized, the relay 83 is closed, opening the circuit through the lines 78, 82 and 84 to the coil 73. The coil 73 is then de-energized, opening the relays 72 and shutting down the equipment operating from the outputs $E_1$, $E_2$ and $E_3$. The relay 81 is also opened, so that the coil 73 remains de-energized even after the coil 85 is de-energized and the relay 83 again opens. To return the power supply to operate the equipment 51, the instructor actuates the "start" push button switch 80 to energize the coil 73 by connecting the lines 78 to the power supply line 75. When the coil 73 is energized, the relay 81 is closed to provide a closed circuit through the lines 78, 82 and 84 and the relays 81 and 83.

In accordance with the present invention, the outputs A and C of FIG. 2 are connected on each side of the panic button switch 88. When the predetermined RF signal is received by the receiver 35 (FIG. 2), the coil 40 is energized, closing the relay 41 and energizing the coil 45. As the coil 45 is energized, the relay 46 is closed to provide a closed circuit between the outputs A and C. As shown in FIG. 4, the closed circuit between the outputs A and C closes the circuit between the power supply line 76 and the coil 85 through the line 87, energizing the coil 85 and closing the relay 83 to open the circuit between the coil 73 and the power supply line 75. The coil 73 is de-energized, opening the relays 72 and shutting down the equipment 51.

The control unit 30 of FIG. 2, along with one of the power shutdown units 50 or 70 of FIG. 3 or 4, is mounted in a common enclosure 90 and mounted on the wall of the laboratory. The enclosure 90 is preferably metallic, although it may be of plastic if safety permits. If the enclosure 90 is metallic, it would be necessary to mount the antenna 36 of the receiver 35 externally of the enclosure 72, as shown in FIG. 2, in order to receive the RF signals from the transmitter unit 10. Alternatively, the enclosure 72 may be mounted with a plastic front panel so that the antenna 36' mounted within the enclosure 72 may be used.

It may be seen that one advantage of the present invention is that the control unit 30 provides the three outputs A, B, and C and it may be retrofitted to existing control systems such as those indicated in FIGS. 3 and 4 without major modifications to the existing system. In addition, the capability of operating the system using the panic buttons 57 or 68 is retained.

While the invention has been shown and described with respect to a specific embodiment thereof, this is intended for the purpose of illustration rather than limitation, and other modifications and variations will be apparent to those skilled in the art all within the intended scope and spirit of the invention. Accordingly, this patent is not to be limited to the specific embodiment herein shown and described, nor in any other way which is inconsistent with the extent to which the progress in the art has been advanced by this invention.

What is claimed is:

1. An emergency power shutdown system for an educational laboratory, comprising:
    a power supply system;
    a plurality of items of potentially dangerous educational equipment, each item connected to be operational only with power from the power supply system;
    a portable transmitter unit adapted to be carried by an instructor in the laboratory, the transmitter unit having a transmitter capable of sending an RF signal, the transmitter unit also having a portable electric power supply, the transmitter being normally disconnected from the portable electric power supply except when it is activated to send an RF signal;
    a control unit fixedly mounted in an enclosure in the laboratory, the control unit including a receiver capable of receiving the RF signal from the transmitter, the receiver including means for sensing a signal from the transmitter and for activating a first relay only upon receipt of said signal, the first relay being open and closed in response to the receipt of the RF signal sensed by the sensing means, the first relay having first and second and third control lines, the first control line being connected to the second control line when the first relay is open and the first control line being connected to the third control line when the first relay is closed; and
    a relay-operated shutdown unit mounted in the enclosure and forming a part of the power supply system, the shutdown unit having a manually operated first switch operatively connected to a coil, the coil operating a second relay connected into the power supply system, the coil also being operatively connected to two of the first and second and third control lines, the coil being actuated by either the manually operated first switch or by actuation of said first contact to open the second relay to interrupt the supply of power through the power supply system, the shutdown unit also having a manually operated second switch to actuate the coil and close the second relay to restore the supply of power through the power supply system.

2. An emergency power shutdown system as defined in claim 1, wherein the transmitter unit sends a digitally encoded RF signal and the receiver includes means for sensing a particularly encoded signal and for activating the relay system only upon receipt of said signal.

3. An emergency power shutdown system as defined in claim 1 wherein the transmitter unit includes a signal indicating when the portable electric power supply is below a predetermined level.

4. An emergency power shutdown system as defined in claim 1, wherein the enclosure is metal and the receiver has an external antenna.

5. An emergency power shutdown system as defined in claim 1, wherein the enclosure is metal with a plastic front, and the receiver has an antenna mounted within the enclosure.

6. An emergency power shutdown system as defined in claim 1, wherein the transmitter unit is capable of sending an RF signal over a range of 50 yards.

* * * * *

UNITED STATES PATENT AND TRADEMARK OFFICE
CERTIFICATE OF CORRECTION

PATENT NO. : 4,378,507
DATED : March 29, 1983
INVENTOR(S) : Robert H. Root

It is certified that error appears in the above—identified patent and that said Letters Patent is hereby corrected as shown below:

Column 1, lines 62 and 63, delete "When the button...the magnet."

Signed and Sealed this

Ninth Day of August 1983

[SEAL]

Attest:

GERALD J. MOSSINGHOFF

Attesting Officer     Commissioner of Patents and Trademarks